United States Patent [19]

Johnson

[11] Patent Number: 4,553,663
[45] Date of Patent: Nov. 19, 1985

[54] CONVEYOR FOR A CROP HARVESTER
[75] Inventor: David W. Johnson, Bennet, Nebr.
[73] Assignee: The Goodyear Tire & Rubber Company, Akron, Ohio
[21] Appl. No.: 609,041
[22] Filed: May 10, 1984
[51] Int. Cl.[4] .............................................. B65G 19/24
[52] U.S. Cl. .................................. 198/731; 198/465.1
[58] Field of Search ............... 198/520, 648, 688, 698, 198/699, 711, 728, 731, 850; 414/24.6; 56/14.5, 14.6

[56] References Cited

U.S. PATENT DOCUMENTS

| 404,460 | 6/1889 | Akerson | 198/731 X |
| 626,572 | 6/1899 | Smyser et al. | 198/699 |
| 2,305,044 | 12/1942 | Toews | 198/688 |
| 2,575,610 | 11/1951 | Ball | 198/731 |
| 4,465,178 | 8/1984 | Coggon | 198/688 |

FOREIGN PATENT DOCUMENTS 0235670 10/1961 Australia .......................... 198/690.2

Primary Examiner—Joseph E. Valenza
Assistant Examiner—Lyle Kim
Attorney, Agent, or Firm—R. D. Thompson

[57] ABSTRACT

Side by side pairs of flexible rubber belts having molded driving lugs on the bottom surface and at least one row of molded cleats with a bore in each cleat on the top surface. The belts are transversely spaced apart with many transverse connecting links positioned in the cleat bores extending between the belts to form a conveying assembly. The conveying assembly is useful in drag or raddle chain conveyors in combines or in round balers to form and compress the large bales.

11 Claims, 5 Drawing Figures

CONVEYOR FOR A CROP HARVESTER

BACKGROUND OF THE INVENTION

This invention generally relates to crop harvesters and, more particularly, to an improved, flexible belt conveyor which may be used for moving harvested grain from one level in the combine harvester to a higher level. This invention is particularly useful in a drag conveying apparatus in which the material to be conveyed is trapped between a floor and the conveyor belt assembly to effect the upward transport of the material by dragging it up the incline. This is in contrast to the more common method of conveying where the transported material is carried on the upper portion of the belt. It also is useful in hay balers for the formation, containment and compaction of the cut hay into large cylindrical bales.

Drag conveyors as are known in the prior art are composed of mechanical chains with metal crossbars traversing the open distance between the chains. These chains are composed of a multiplicity of parts, including plates, pins, brackets and miscellaneous linkage parts. These mechanical chain conveyors suffer from a number of problems deriving from the many parts involved in the chain configuration. These mechanical chains are subject to stretching due to wearing and elongation of the holes through which the link pins or other fastening means are located. Over a relatively short period of operation of the harvester, the mechanical chain will actually expand in overall length by several inches requiring constant adjusting during harvesting operations to take up the slack created. If one of the metal pieces is broken and becomes entrained with the crop that is being harvested, the dislodged part may seriously damage or cause a lockup of downstream processing mechanisms in the harvester including knife cylinders, high speed fans, etc. A major performance limitation of the mechanical chain configuration of the prior art is that it is limited to low speed operation and is objectionably noisy. In addition, there is continuous maintenance required on such mechanical chains, in that the need for lubrication is constant, and metal parts must periodically be replaced. The metallic chains are also very heavy and add to the weight of the harvester.

Flexible belts having lugs on one surface adapted for positive driving by a sprocket and having molded transverse ribs on the upper surface are known for crop gathering use where a pair of belts are positioned to entrap grain stalks between the opposed ribbed surfaces of the belts. Such belts suffer the disadvantage that when a transverse cleat is damaged, or ripped off during harvesting operations, the entire belt must be replaced. Such an occurrence is not unusual when crop residue, rocks or debris become jammed in the conveyor. A belt having the transverse molded ribs covering the complete width of the conveying mechanism in a combine adds considerable weight to the harvester and is very expensive to produce as an endless belt without mechanical splice.

BRIEF DESCRIPTION OF THE INVENTION

In view of these and other problems associated with presently known types of conveyor means for harvesters, this invention overcomes the shortcomings of the prior art conveyors. An advantage of this invention is to provide a flexible endless belt conveyor that eliminates the maintenance requirements, damage potential, and excessive weight of prior art conveyors. The present invention substantially eliminates moving mechanical parts thus avoiding damage to downstream crop processing mechanisms in the harvester. It further provides quiet operation without need for lubricants. The design provides easy replacement of crossmembers which are damaged during operation. Much higher speeds of operation of the conveying mechanism can be attained through use of this invention. These advantages are accomplished using a crop conveying assembly comprising: a plurality of side by side, spaced apart, flexible belts; and a plurality of connecting links positioned transversely between said side by side belts, each of said belts having an elastomeric body with a top surface, a bottom surface, a longitudinally substantially inextensible tensile member disposed within said elastomeric body, a plurality of longitudinally spaced integrally molded lugs on the bottom surface, a plurality of longitudinally spaced raised cleats integrally molded to the top surface, each of said cleats having an aperture extending transversely therethrough and wherein the cleats of each adjacent side by side belt being positioned such that the apertures therein are transversely aligned and wherein the plurality of connecting links are positioned transversely of the belts by positioning the ends of the connecting links within the apertures of adjacent side by side belts.

BRIEF DESCRIPTION OF THE DRAWINGS

The features and advantages of the invention will be better understood from a consideration of the following description when taken in conjunction with the accompanying drawings in which.

DETAILED DESCRIPTION OF THE INVENTION

Figure 1:
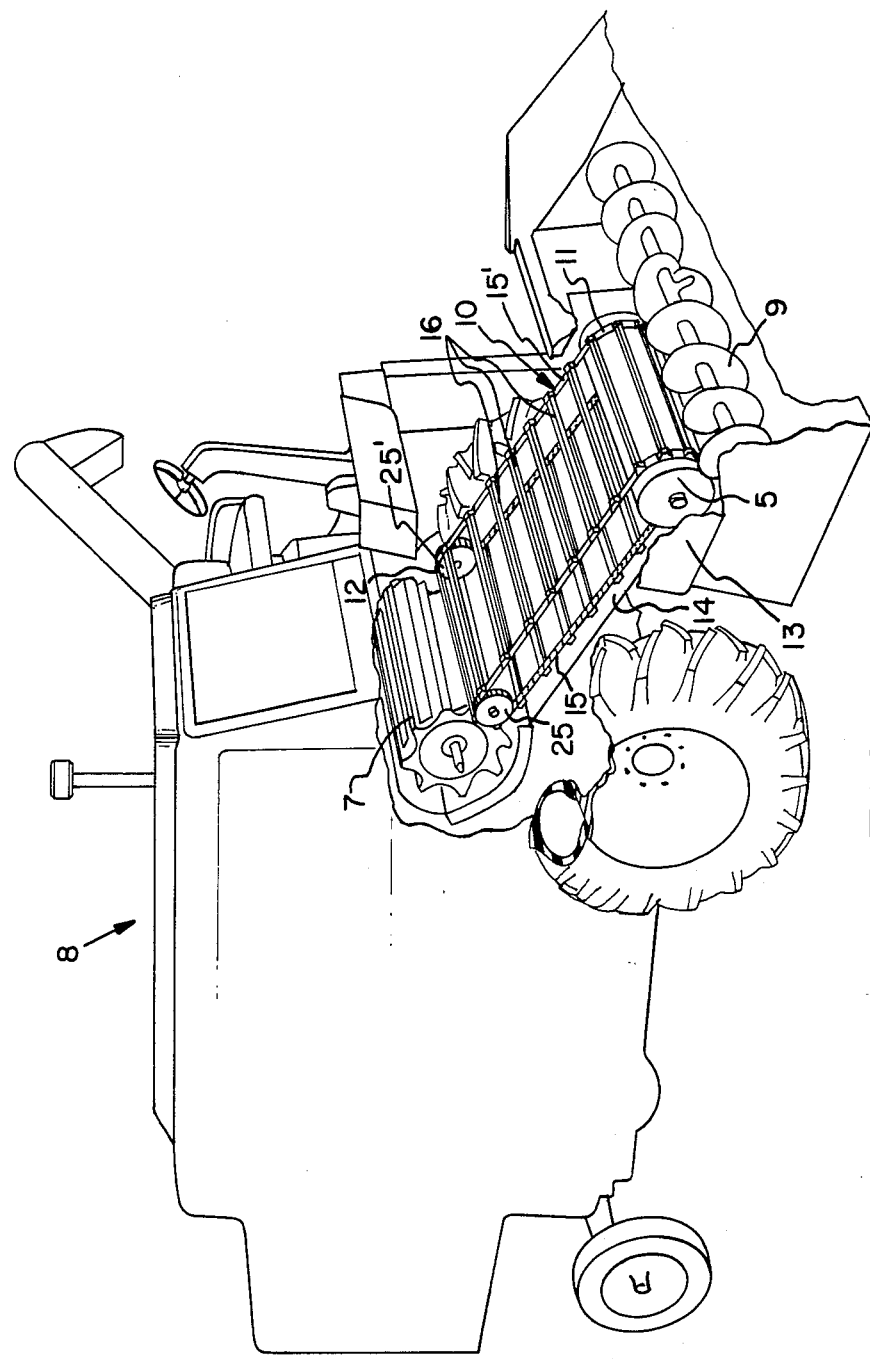
FIG. 1 is a perspective view of a combine harvester with portions of the housing cut away to expose a feeder house conveyor equipped with the crop conveying assembly of the invention.

Referring to FIG. 1, a conveyor for a combine harvester 8 is generally indicated by a reference numeral 10. The forward end 11 is positioned in a harvester such as a combine 8 toward the crop gathering forward end of the combine. An auger 9 may feed the conveyor. The rearward end 12 discharges the crop into an additional processing step in the combine such as a cylinder 7, straw walker, or separation and sieve mechanisms. The harvester conveyor 11 includes a shroud 13 which completely encloses the conveyor during operation. The shroud 13 includes an inclined conveyor bottom surface 14. The conveyor shown in FIG. 1 and FIG. 2 includes two or more juxtaposed, adjacent belts 15 and 15' which are rotatably mounted on drive and idler means which are shown in FIG. 1 as a pair of toothed pulleys 25 and 25' and an idler drum 5. Positioned transversely between the belts 15 and 15' are connecting links 16.

Figure 2:
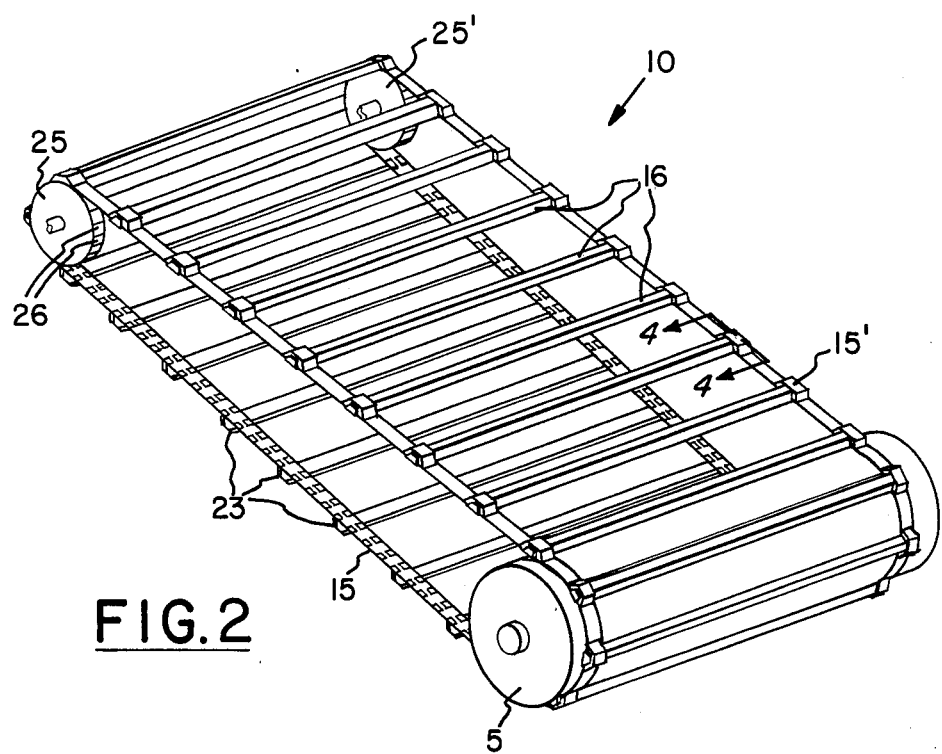
FIG. 2 is an isometric view of the crop conveying assembly of FIG. 1, removed from the combine to expose the complete crop conveyor with sprockets and idler.
Figure 4:
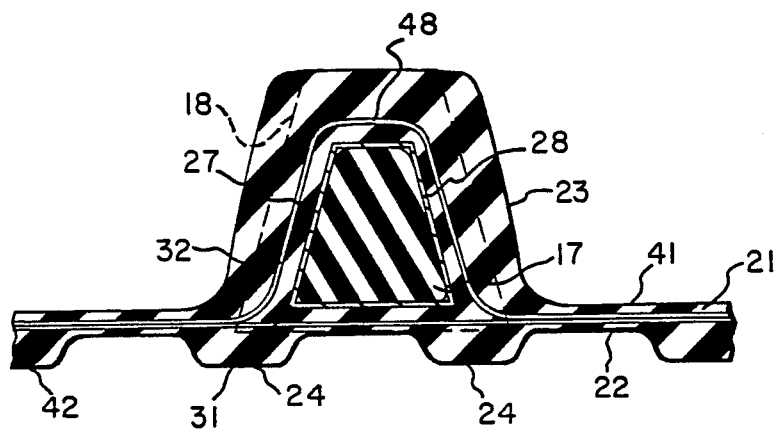
FIG. 4 is a portion of the longitudinal cross-sectional view of the preferred embodiment of the endless flexible belt as shown in FIG. 2 utilizing longitudinal reinforcement in the cleat.

The belts 15 and 15' and connecting links 16 are shown in isolation in FIG. 2. The belts 15 and 15' are identical in construction. Referring now to FIG. 4, the belt 15 is composed of an elastomeric body 20 made from an elastomeric and resilient material suitable for the working environment. The elastomeric body 20 may be a unitary structure or may include a first layer 21 and a second layer 22 which are substantially parallel and composed of the same or different elastomeric and resilient materials. Representative of examples, elastomeric materials which may be used include thermosetting natural or synthetic rubbers, thermoplastic elastomers and urethanes. The first layer 21 includes integrally molded elastomeric cleats 23 to form the top surface 41. The cleats 23 are spaced regularly around the full longitudinal or circumferential length of the belt 15. The second layer 22 forms a positive driving portion of the belt 15 and includes a plurality of longitudinally spaced lugs 24, integrally molded to the second layer to form the bottom surface 42. The lugs may have any desired spacing for meshing with a tooth pulley or sprocket. A single row of lugs may be utilized, however, it is preferable that there be two rows of lugs on the second layer spaced transversely apart. The lugs of each longitudinal row should be preferably aligned transversely with lugs of the adjacent lug row. The sprockets 25, 25' utilized in the crop conveying assembly of FIG. 2 contain lug engaging teeth 26. While FIG. 2 shows two rows of lugs 24 on each belt, it may be desirable to have three or more such rows or a single row of lugs recognizing that the sprocket utilized would be complementary to the lug configuration. Special tough, abrasion resistant elastomers may be utilized for the first layer 21 and/or the second layer 22 to provide extra shear force resistance to the lugs 24 and cleats 23. Oriented fiber reinforced rubber compounds are particularly adapted for meeting these requirements.

Imbedded within the polymeric body 20 or alternatively positioned between the first layer 21 and second layer 22 is a longitudinal load bearing tensile member 31. The tensile member should be substantially inextensible in the range of working tension exerted during use in a crop conveying assembly. The tensile member 31 may be composed of any conventionally used high modulus of elongation material which exhibits elongation in an acceptable range for the tension which is exerted on the belt 15 during operation. Steel wire, fiberglass, or aromatic polyamide are preferred high modulus load bearing members due to their low elongation at high tensile stresses. Other conventional tensile members such as polyester, nylon and rayon may be used for lighter duty applications where the working tension placed on the belt during operation is relatively low. The tensile member may be formed in any conventionally known manner including spiralling one or more strands onto a forming mandrel to form a continuous, endless tensile member. Alternatively, strips of reinforcement having a longitudinally oriented tensile material such as tire cord fabric may also be overlap spliced to form a continuous tensile member, which has sufficient splice strength to remain substantially inextensible at operating tensions.

Additional plies of reinforcing fabric may be positioned over and/or under the load bearing tensile member 31. The reinforcement layers may be formed of any conventional belt fabric such as square-woven, bias fabrics or cords to impart additional longitudinal and transverse strength and to protect the tensile member from damage during service.

Figure 5:
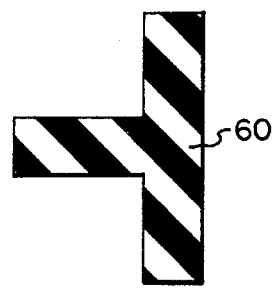
FIG. 5 is a longitudinal cross-section of a T-shaped connecting link.

The cleats 23, as shown in FIG. 4, must contain therein an aperture 27 adapted to accommodate the complementary shaped end cross-section of connecting links 16. The cleats 23 contain an aperture 27 extending transversely through the cleat, having an axis generally parallel to the top surface of the belt and perpendicular to the direction of the cords in the tensile member or the longitudinal axis of the belt. Connecting links 16 are positioned such that the extreme ends 17 of the connecting links 16 are adapted to extend through the cleat aperture 27, which is complementary thereto. Connecting links 16 form the crop engaging portion of the crop conveying assembly. The connecting links 16 scrape along bottom surface or pan to trap the grain in front of the leading edge to transport the grain up the inclined bottom surface. The connecting links 16 are elongated structures having a relatively uniform cross-section through the central portion of their length. The cross-section may be any shape, including rectangular, trapezoidal, square, round, oblong, triangular, or T-shaped 60 as shown in FIG. 5. The axially extreme end portions 17 of each connecting link may preferably have a cross-section of lesser height than the central portion 18 of the link. Height refers to that dimension of the connecting link which lies perpendicular to the plane of the belt tensile member. The cross-section of the end portions may either be of the same shape as the central portion or it may be a different shape. Choice of shape will be made to assure sufficient structural strength of the link to withstand the external load stresses during operation of the crop conveying assembly and also to minimize the shearing stresses on the portion of the cleat surrounding aperture. The necessity for a lesser height for the end portions of the link extending into the aperture is important in a drag conveying assembly as shown in FIG. 1 and FIG. 2 to assure that the central portion of each connecting link can scrape along the bottom 14 of the conveyor housing, thus efficiently pulling or dragging the grain up the inclined bottom surface 14. In this configuration, the top surfaces of the cleat and connecting link, that is, the surfaces distal the tensile member, lie in an imaginary plane parallel to the plane of the tensile member. It is understood that in an application such as a round baler compacting and forming chain this requirement for the termination of the connecting link at the same height as the top of the cleat is not a necessary limitation and the connecting link may have a uniform cross-section through its length.

The connecting links 16 may be composed of metal, rubber, rubber reinforced with a rigid rod extending through its length, reinforced fiberglass, rubber or urethane. Any material which is suitably resistant to deformation may be utilized. The most preferred embodiment is a reinforced rubber connecting link due to its ability to deflect during severe impact and rebound to the original shape with no permanent disformation. The connecting links may optionally be secured in position within the aperture 27 through the use of set screws, pins extending therethrough or other means for limiting movement in the transverse direction to the belt. A preferred configuration is shown in FIG. 4 where the aperture 27 is reinforced by use of hard rubber, metal or plastic inserts 28 which are bored to accommodate and match the cross-sectional profile of the end of the connecting links 16. The inserts improve the capability of each cleat to resist ripping during the application of severe longitudinal shear stresses during harvesting operations.

An optional cleat reinforcement layer 48 is shown extending within the elastomeric cleat body over the aperture 27 and extending down to run generally parallel to the load bearing tensile member 31. It follows a generally sinusoidal path essentially parallel to the top surface 41 of the belt. This cleat reinforcement layer 48 is useful in dissipating shear stresses which develop during operation of the crop conveying apparatus around the aperture 27. Specially reinforced elastomeric compounds may be utilized in the molding of the cleat portion in order to provide additional resistance to these shear stresses.

Figure 3:
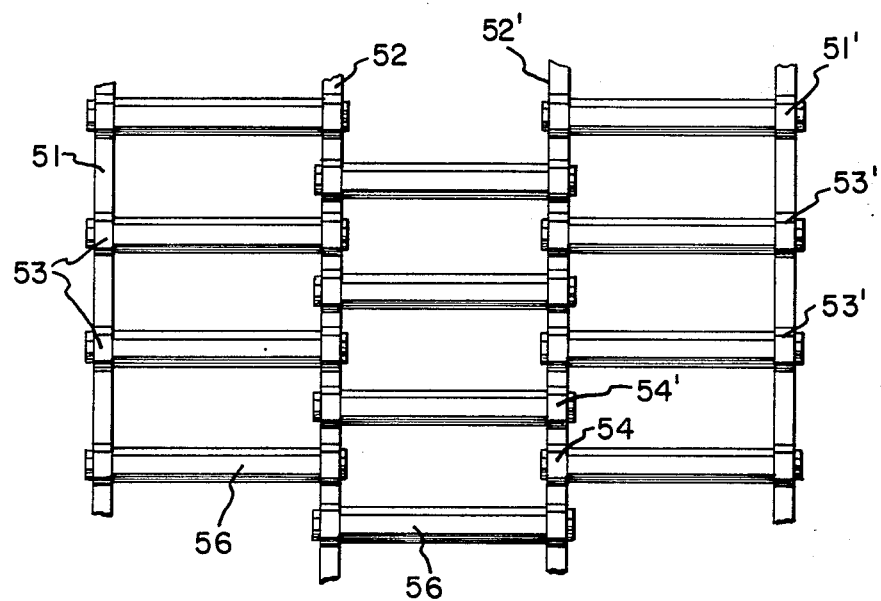
FIG. 3 is an alternative embodiment of a portion of a the crop conveying assembly using several side by side crop conveying assemblies for use in a wide crop conveyor system.

FIG. 1 and FIG. 2 shows a conveyor having a single crop conveying assembly consisting of two parallel belts with connecting links extending between the two belts. FIG. 3 shows an alternative embodiment of a wide conveyor system which utilizes several side by side crop conveying assemblies in the conveyor. The outermost two belts 51 and 51' contain a single row of longitudinally spaced cleats 53 and 53' around their circumference while the center belts 52 and 52' contain double the number of cleats 54 and 54' on each belt to accommodate the juxtaposed sets of connecting links 56 positioned in the cleat apertures. Each successive cleat along the circumference of each center belt 52 and 52' receives the end of a connecting link from the opposite direction with all links being positioned transversely of the belt. Another alternative embodiment would be to have cleats on the center belts which have transverse widths great enough to accommodate connecting links ends inserted from both sides, wherein the innermost belts would have an equal number of cleats as the outermost belt.

The belts useful in this invention can be made according to conventional techniques for producing endless belts. A preferred endless belt uses a natural and styrene-butadiene rubber blend for the elastomeric body with a continuously wound, aromatic polyamide filament tensile member. The uncured belt composite is formed then subjected to heat and pressure to complete formation of the cleats and driving lugs and to cure the elastomer. Assembling the crop conveying assemblies is accomplished by inserting one end of the connecting links into the aperture provided in the cleats of one belt of the assembly, then sliding the opposite end of the connecting link into a transversely aligned aperture in a cleat of the second belt of the assembly. Replacement of connecting links which become bent, chipped or broken during routine crop gathering operations may be accomplished quickly in the field by simply loosening the belts of the assembly and inserting a replacement connecting link into the cleat aperature and then tightening the belt members. The belts on a combine of FIG. 1 can be easily loosened by slackening the idler drum 5 shown in FIG. 1.

The crop gathering assembly of this invention is free of the operational difficulties associated with a belt assembly wherein a connecting link or a cleat is attached through a punched hole in the belt carcass. Any time a hole is punched through a belt carcass, this attachment point becomes a stress center during operations under tension, and the hole in the belt carcass will inevitably be the failure point. This invention allows for thinner, lighter weight belts, which can be run over small diameter sprockets and idlers at high speed, due to the relatively thin belt carcass required. When a hole is being punched through the belt carcass and tensile member, the carcass must be made correspondingly thicker and more heavily reinforced to accommodate the loss in load bearing capabilities. This thicker cross-section of the belt in prior art assemblies where bolting of the cleat and/or the connecting link may be done through the belt carcass leads to inferior performance when compared to the crop gathering assembly of this invention. Actual field testing of the crop gathering assembly of this invention on a combine harvester demonstrated that conveyor speeds of 800 feet per minute were easily attainable using the rubber belt and connecting link assembly of this invention. This is in contrast to conventional mechanical chain connecting link configurations where 400 feet per minute is the maximum conveyor speed which may be obtained. Maximum longitudinal stretch may be limited to between $\frac{1}{2}$ and 4 percent by use of the preferred very high modulus load bearing tensile members such as an aromatic polyamide, fiberglass, or steel cord. If other conventional tensile members material such as nylon or polyesters is used, stretch may exceed 4 percent. The degree of stretch is also dependent on working tension.

Commercial Applicability

The crop conveying assemblies composed of two belts spaced apart with connecting links extending between the longitudinally aligned cleats of the belts offer a greatly improved system for conveying grain within a harvester, or for forming and compacting large cylindrical bales in a hay baler. Each assembly is lightweight, requires no lubrication, has no metal parts, and with proper selection of the load bearing tensile member, exhibits virtually no stretching during crop gathering operations. All these attributes lead to low maintenance, long life, operating economy and quiet conveyor operation. Additionally, the conveyor can be run at greatly increased speeds when compared to the prior art mechanical chain link systems. Further, the weight saving is substantial; a metal chain conveyor for a small combine weighs 200 pounds while the rubber crop conveyor of this invention weighs only 90 pounds.

I claim:

1. A crop conveying assembly comprising:
   a plurality of side by side, spaced apart, flexible belts; and a plurality of connecting links positioned transversely between said side by side belts, each of said belts having an elastomeric body with a top surface, a bottom surface, a high modulus tensile member disposed within said elastomeric body, a plurality of longitudinally spaced lugs integrally molded to the elastomeric body to form the bottom surface, a plurality of longitudinally spaced raised cleats integrally molded to the elastomeric body to form the top surface, a plurality of said cleats having an aperture extending transversely therethrough and wherein the cleats of each belt are positioned such that the apertures therein are transversely aligned with the apertures of an adjacent belt and wherein the plurality of connecting links are positioned to transversely span the space between adjacent belts by removeably engaging the ends of the connecting links within the apertures of the belts.

2. A crop conveying assembly of claim 1 wherein each of said connecting links' has a relatively larger cross-section central portion and relatively smaller cross-section end portions.

3. A crop conveying assembly of claim 2 wherein the top surface of each cleat and the top surface of each connecting link lie in an imaginary plane parallel to the tensile member.

4. A crop conveying apparatus as set forth in claim 1 wherein said belt is an endless type belt having elastomeric body composed of a first layer and a second layer having said tensile member interposed therebetween, said first layer having as its outer peripheral surface the top surface and being composed of a first flexible elastomeric material, said second layer having the bottom surface as its outer surface and being composed of a second flexible elastomeric material.

5. A crop conveying assembly as set forth in claim 1 wherein said longitudinally spaced lugs are arranged in a plurality of rows spaced transversely apart across said bottom surface of said belt.

6. A crop conveying assembly as set forth in claim 1 further comprising inserts securely positioned surrounding each of said apertures.

7. A crop conveying assembly as set forth in claim 1 wherein the longitudinal cross-section of said connecting link is T-shaped.

8. A crop conveying assembly as set forth in claim 1 wherein said belt contains additional reinforcing layers positioned within said elastomeric body.

9. A crop conveying assembly as set forth in claim 8 wherein said belt includes a cleat reinforcing layer positioned within said elastomeric body across the full transverse width of the belt following a generally sinusoidal path parallel to the top surface of said belt, such that said cleat reinforcing layer lies between the top surface of the belt and each of said apertures in said cleats.

10. A flexible conveyor for a crop harvester having a longitudinal direction and a transverse direction comprising:
 (a) a plurality of side by side, transversely spaced flexible belts, each belt having an elastomeric body, a top surface, a bottom surface, and a tensile member substantially inextensible in the longitudinal direction embedded in the elastomeric body, a plurality of longitudinally spaced apart lugs integrally molded to the elastomeric body to form the bottom surface, a plurality of longitudinally spaced apart cleats integrally molded to the elastomeric body to form the top surface, each of said cleats having an aperture extending transversely therethrough, the cleats of each pair of side by side belts being positioned in the transverse direction such that the apertures are aligned;
 (b) a plurality of connecting links positioned transversely of the belts by having each end of each link removably extending into said apertures in said cleats of adjacent belts;
 (c) at least one toothed pulley positioned to meshingly engage said lugs in said belt.

11. A flexible conveyor according to claim 10 comprising two outermost and two innermost side by side flexible belts wherein the innermost belts have twice the number of cleat apertures as either of the outermost belts and the transverse connecting links extending from the outermost belts are positioned within the cleat apertures of the innermost belts transversely aligned with each outermost belt.

* * * * *